June 11, 1929.     O. A. SCHUCHERT     1,716,604
NONGLARE DEVICE
Filed May 31, 1927     2 Sheets-Sheet 1

June 11, 1929.  O. A. SCHUCHERT  1,716,604
NONGLARE DEVICE
Filed May 31, 1927  2 Sheets-Sheet 2

Inventor
O. A. Schuchert
By Monroe E. Miller
Attorney

Patented June 11, 1929.

1,716,604

UNITED STATES PATENT OFFICE.

OTTO A. SCHUCHERT, OF ELGIN, ILLINOIS.

NONGLARE DEVICE.

Application filed May 31, 1927. Serial No. 195,477.

The present invention relates to non-glare devices for vehicle headlamps, spotlights, and the like, and the invention aims to provide a novel and improved non-glare device to be disposed across a source of light, such as the headlight of a motor vehicle, for confining the projected light rays within desired limits and concentrating same on the road, as well as preventing the blinding of persons in approaching vehicles.

Another object of the invention is the provision of a non-glare device of the kind indicated comprising a group of similar units, whereby a number of the units may be assembled to provide an effective means to prevent glaring of the light above a horizontal plane; and a further object in this connection is to provide a unit adapted to be assembled with other like units which may be economically stamped from sheet metal.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
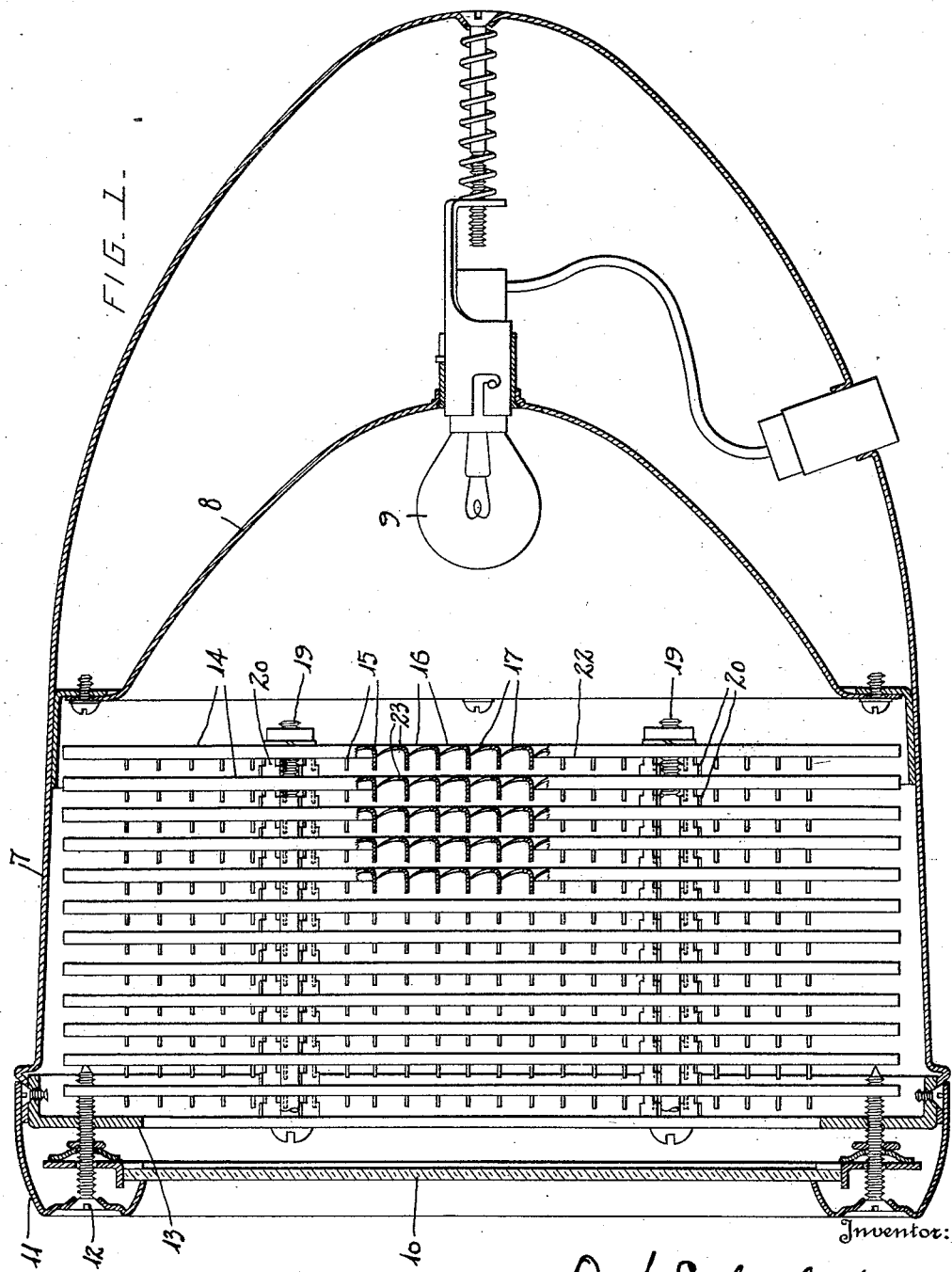
Figure 1 is a vertical median section of a vehicle headlamp illustrating the improved non-glare device therein, said device and other portions being shown in elevation, and some of the units of said device being partly shown in section.
Figure 2:
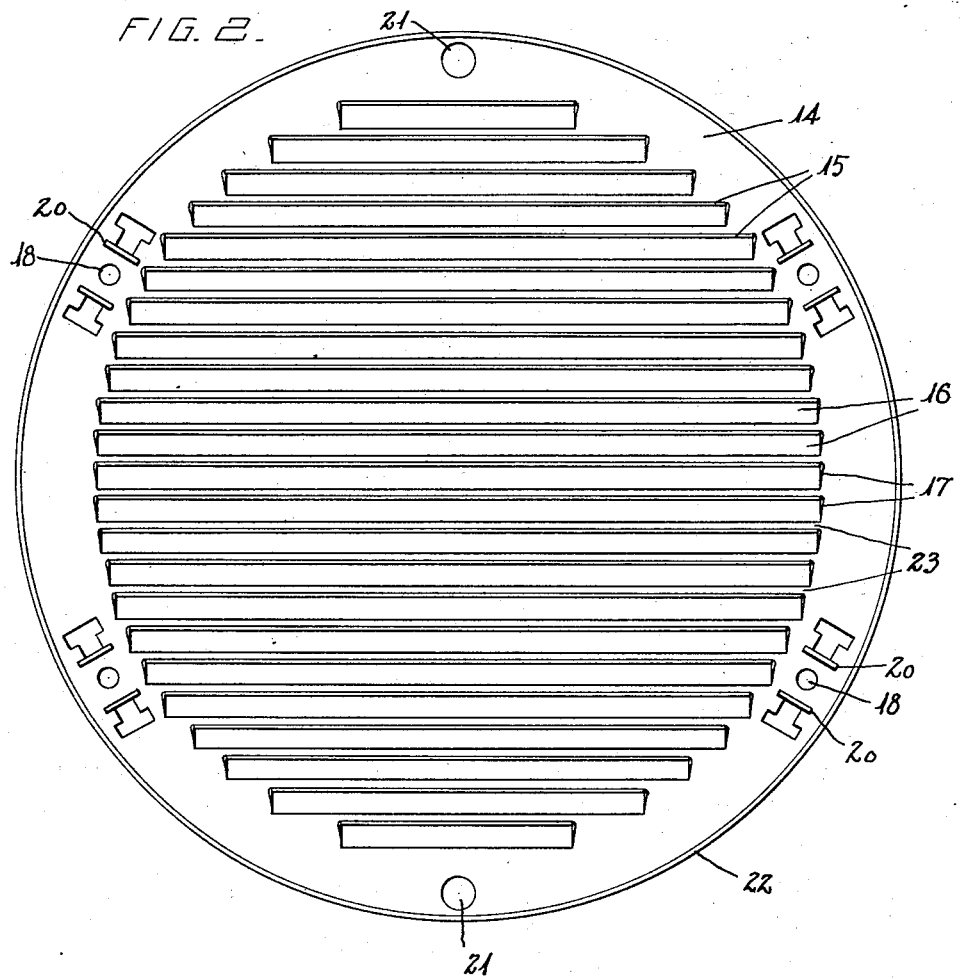
Fig. 2 is a face view of one of the units of the non-glare devices.

The headlamp shown in Fig. 1 comprises the casing or shell 7 having the reflector 8 therein within which the electric lamp 9 or other source of light is located, and a lens 10 is disposed across the open end of the casing 7 and is retained in place by a bezel 11, which, as shown, is fastened over the open end of the casing 7 by means of screws 12 threaded through a ring or rim member 13 secured within the open end of the casing 7. The structure of the lamp is conventional, and forms no part of the present invention, it being understood that the present device may be applied to various lamps from which light rays are projected in one direction. As shown in Fig. 1, the casing 7 is elongated to provide space between the reflector 8 and lens 10 for the accommodation of the non-glare device, although it will be understood that the non-glare device may be located either behind or in front of the lens 10, and may be used with or without a lens, or with a plain or other lens.

In carrying out the invention the device comprises a group of spaced plates or disks 14 which are disposed in planes substantially at right angles to the focal axis of the bulb or source of light 9, and which plates are spaced apart longitudinally of said axis. The plates 14 may be of suitable sheet metal and may be readily stamped out at small cost. The plates are circular as shown but may be of other outlines to conform to lamps of various shapes. Vertically spaced horizontal flanges 15 are struck from each plate 14, being bent forwardly and upwardly, so as to project horizontally forward, and said flanges being punched from the plate provide horizontal slots 16 in the plate below the corresponding flanges through which the light rays may pass, the plate being of opaque material. The ends of the flanges 15 are not completely severed from the body of the plate 14, thereby providing webs 17 between the ends of the flanges and corresponding slots, to brace the flanges.

Any suitable number of such units are employed, and register with one another, so that the light rays may pass through the slots 16 of the several units or plates. In order to support the several units the plates 14 have apertures 18 near the margin thereof to receive clamping bolts 19 which extend through the several units and also through the ring 13 or other support. The units are thus readily clamped together and against the supporting member. Spacer portions 20 are struck from the plates 14 at opposite sides of the apertures 18, and extend forwardly from the plates to contact with the plates in front, thereby spacing the plates apart the desired distance, as seen in Fig. 1.

The plates have apertures 21 in order that those side plates adjacent to the ring 13 may receive the screws 12 in said openings or apertures 21, without interference.

The plates or units may be readily stamped from thin sheet metal, so as to be inexpensively manufactured and they are readily assembled. In order to stiffen the plates, each of them is provided with a marginal forwardly extending flange or rim 22. The rear surfaces of the plates 14 are thus flat and the flanges 15, spacers 20 and flanges 22 all extend forwardly from the plates, thereby facilitating manufacture, and also leave the rear surfaces of the plates smooth or plain so that light rays striking the rearmost plate or unit may all be reflected back to the reflector 8 and may thus be reflected forwardly to pass through the slots.

By the provision of the non-glare device in front of the bulb 9 and reflector 8, the light rays are compelled to pass through the slots 16 horizontally or in substantial horizontal planes. The forwardly extending flanges 15 are located above the slots or extend forwardly from the upper edges of the slots and prevent the light rays from passing out of the casing above a horizontal plane, it being noted that the light rays in striking the lower surfaces of the flanges 15 will be reflected downwardly. This will result in the light rays being held down and spread on the road in front of the vehicle. The bars 23 between the slots 16 extend upwardly from the flanges 15 and thus provide barriers to the forward passage of light rays, and have a tendency to stop the light rays which are reflected downwardly from the flanges 15 above. The bars 23 thus serve to cast shadows on the upper surfaces of the flanges 15, and thereby reduce if not entirely prevent the upward reflection of light rays from the upper surfaces of the flanges 15, especially those of the plates or units 14 at the front.

Having thus described the invention, what is claimed as new is:—

The combination with a headlamp comprising a shell having a reflector therein, a lens spaced from the reflector and a source of light within the reflector, of a plurality of vertical plates spaced one behind each other and transversely to the axis of the reflector and positioned between said lens and reflector, each plate having vertically spaced slots with flanges projecting in horizontal planes forwardly from the upper edges of said slots, said plates having bars in the planes thereof extending upwardly from said flanges to shade the upper surfaces of said flanges from the light rays passing through said slots, said slots of the several plates being in horizontal registration and said flanges being arranged in vertically spaced horizontal planes, and means securing said plates together in a group and mounting them in said shell.

In testimony whereof I hereunto affix my signature.

OTTO A. SCHUCHERT.